US008588972B2

(12) United States Patent
Fung

(10) Patent No.: US 8,588,972 B2
(45) Date of Patent: Nov. 19, 2013

(54) METHOD FOR CREATING LOW-COST INTERACTIVE ENTERTAINMENT ROBOTS

(76) Inventor: Hei Tao Fung, Fremont, CA (US)

(\*) Notice: Subject to any disclaimer, the term of this patent is extended or adjusted under 35 U.S.C. 154(b) by 219 days.

(21) Appl. No.: 13/088,399

(22) Filed: Apr. 17, 2011

(65) Prior Publication Data

US 2012/0264414 A1   Oct. 18, 2012

(51) Int. Cl.
*G06F 19/00*   (2011.01)
(52) U.S. Cl.
USPC ............... 700/245; 700/250; 700/264; 901/1; 446/454; 446/456; 446/465; 446/470; 455/418; 455/419
(58) Field of Classification Search
USPC ............... 700/245–264; 901/1; 455/418–420, 455/552.1, 557–559; 446/454–471
See application file for complete search history.

(56) References Cited

U.S. PATENT DOCUMENTS

| 6,343,970 | B1* | 2/2002 | Lee et al. ....................... 446/330 |
| 6,616,464 | B1 | 9/2003 | Tosaka |
| 7,720,572 | B2 | 5/2010 | Ziegler et al. |
| 7,841,922 | B2* | 11/2010 | Discoe et al. .................. 446/465 |
| 2006/0241812 | A1* | 10/2006 | Jung ............................... 700/254 |
| 2008/0215183 | A1 | 9/2008 | Chen et al. |
| 2009/0198376 | A1 | 8/2009 | Friedman et al. |
| 2011/0288684 | A1* | 11/2011 | Farlow et al. ................. 700/264 |
| 2012/0121161 | A1* | 5/2012 | Eade et al. .................... 382/153 |
| 2013/0019019 | A1* | 1/2013 | Lam ............................. 709/226 |

FOREIGN PATENT DOCUMENTS

JP   2010012529 A  *  1/2010

\* cited by examiner

*Primary Examiner* — Allahyar Kasraian

(57) ABSTRACT

A method for creating low-cost interactive entertainment robots is disclosed. The cost of the robots is reduced by using a commodity computing device: smart phone, and by having robotic bodies use a decoder of a set of movement commands that facilitates the interoperability between a variety of smart phones and a variety of robotic bodies. Smart phones are equipped with powerful CPU, touch screen, USB, camera, microphone, Bluetooth, WI-FI, etc. They are fit for being the robot control units with the relevant robot applications installed. The cost of robotic bodies can be reduced by minimizing the amount of processing and sensing there and having them focus on mechanical movements. Furthermore, by defining and using a set of movement commands that promotes interoperability between a variety of robot control units and a variety of robotic bodies, the cost of robotic bodies can be reduced through mass production.

12 Claims, 4 Drawing Sheets

--- Prior Art ---

| Protocol Data Unit | | | | | | | | Meaning |
|---|---|---|---|---|---|---|---|---|

| a | a | a | a | a | a | a | a |
|---|---|---|---|---|---|---|---| aaaaaaaa: Duration of operation in 0-255 time units

| b | b | b | b | c | c | c | c |
|---|---|---|---|---|---|---|---| bbbb: Magnitude for Motor 1 in -4 to +3 units
cccc: Magnitude for Motor 2 in -4 to +3 units

| d | d | d | d | 0 | 0 | 0 | 0 |
|---|---|---|---|---|---|---|---| dddd: Magnitude for Motor 3 in -4 to +3 units

FIG. 4

METHOD FOR CREATING LOW-COST INTERACTIVE ENTERTAINMENT ROBOTS

FIELD OF THE INVENTION

The present invention relates to robots. More specifically the present invention relates to creating a variety of low-cost interactive entertainment robots.

BACKGROUND

The International Federation of Robotics (IFR) and the United Nations Economic Commission for Europe (UNECE) categorize robots into industrial robots and service robots. Service robots can be categorized into professional use and domestic use. Domestic robots can be applied to household chores, entertainment (for education, information, games, etc.), and so on. While domestic robots are getting popular, they tend to be specialized in certain tasks and quite costly. The challenge of making domestic robots a commodity is still there. Meanwhile, smart phones are becoming ubiquitous and commoditized. Smart phones possess some capabilities such as powerful CPU, camera, microphone, speaker, touch screen for sensing, internet access via wireless connection, etc. The situation presents an opportunity for commoditizing domestic robots.

SUMMARY OF THE INVENTION

A method for creating low-cost interactive entertainment robots is disclosed. The cost of the robots is reduced by using a commodity computing device: smart phone, and by defining a set of movement commands that facilitates interoperability between a variety of smart phones and a variety of robotic bodies that use the decoder of the set of movement commands.

Smart phones are equipped with powerful CPU, touch screen, USB, camera, microphone, speaker, Bluetooth, WI-FI, etc. They are fit for being the robot control units with the relevant robot applications installed.

The robots made of smart phones can interact with users and environment in a number of ways. The camera captures images of users and environment. Through image processing and artificial intelligence, the robots can identify the users and the environment. The microphone captures the sound of users and environment. Through audio signal processing and artificial intelligence, the robots can identify the users, commands, and the environment. The GPS capability of smart phones can provide location information. The touch screen provides touch sensing capability and displays images and graphics. The wireless connection provides access to local servers or internet servers. Artificial intelligence can be implemented on smart phones' CPUs, local servers, and internet servers.

The cost of robotic bodies can be reduced by minimizing the amount of processing and sensing there and having them focus on mechanical movements. That is achieved by enabling the robotic bodies to only contain a decoder of movement commands. The movement commands instruct the robotic bodies to perform simple motor and switch operations. The decoder translates the movement commands into outputs of electrical signals that control motors and switches resulting in mechanical movements. By defining a set of movement commands that facilitate interoperability between a variety of robot control units and a variety of robotic bodies, massive production of the movement command decoder is possible, bringing down the cost of the movement command decoder. Consequently, because of interoperability and lost-cost movement command decoder, massive production of robotic bodies is possible, bringing down the cost of robotic bodies.

BRIEF DESCRIPTION OF THE DRAWINGS/FIGURES

The present invention will be understood more fully from the detailed description that follows and from the accompanying drawings, which however, should not be taken to limit the disclosed subject matter to the specific embodiments shown, but are for explanation and understanding only.

FIG. 4 illustrates how a sequence of movement commands is encoded in Bluetooth protocol data unit.

DETAILED DESCRIPTION OF THE INVENTION

Figure 1:
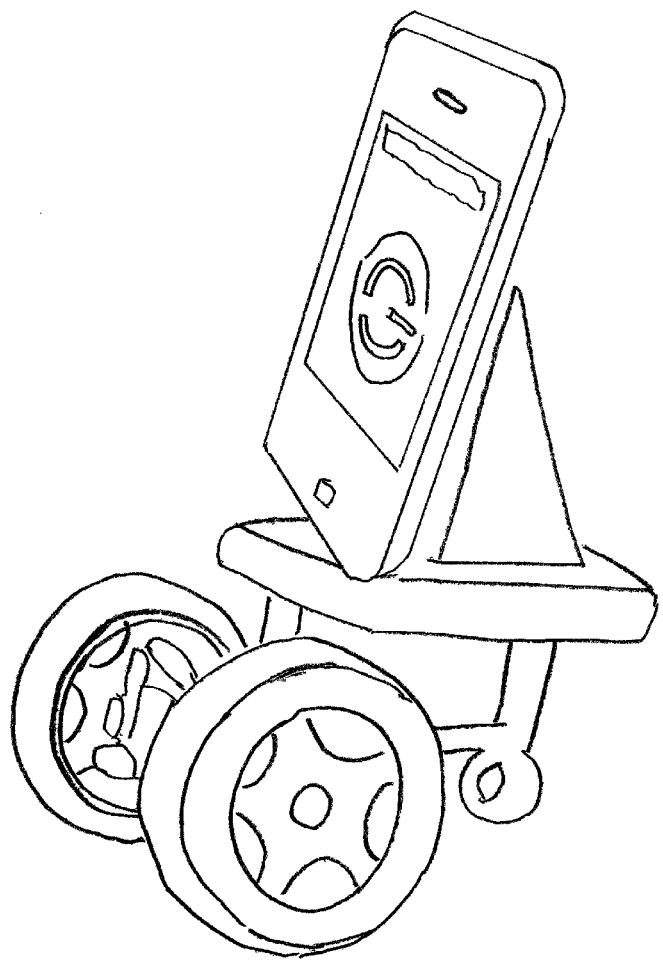
FIG. 1 illustrates how an embodiment of the invention disclosed is deployed.

A method for creating low-cost interactive entertainment robots is disclosed. The cost of the robots is reduced by using a commodity computing device: smart phone, and by defining a set of movement commands that facilitate the interoperability between a variety of smart phones and a variety of robotic bodies that use the decoder of the set of movement commands. FIG. 1 shows an example of a low-cost interactive entertainment robot as a combination of a smart phone and a wheeled robotic body. The smart phone is seated onto the holder of the wheeled robotic body. There can be a small degree of tilting of the smart phone as its holder is controlled by a motor. The robotic body has three wheels. Two front wheels are controlled by two separate motors so that there can be forward, backward, and rotational movements. The third wheel is free to turn and roll and is for balance.

Smart phones are equipped with powerful CPU, touch screen, USB, camera, microphone, speaker, Bluetooth, WI-FI, etc. They are fit for being the robot control units with the relevant robot applications installed.

The robot applications process the decision inputs using image processing, audio signal processing, and artificial intelligence algorithms and generate the decision outputs.

The robots made of smart phones can receive decision inputs from users and environment in a number of ways. The camera captures images of users and environment. The microphone captures the sound of users and environment. The GPS capability of smart phones can provide location information. The touch screen provides touch sensing capability. The wireless network connection provides access to local servers or internet servers.

Through image processing, audio signal processing, and artificial intelligence algorithms, using decision inputs the robot applications can identify the users, the environment, the users' inputs, and location, assess the situation using prior experience with users, leverage data on the internet, and produce decision outputs.

Image processing, audio signal processing, and artificial intelligence algorithms can be implemented on smart phones' CPUs, local servers, and internet servers. The robot applications may leverage the processing power and storage power of local servers and internet servers through wireless network connection.

The output decisions are reflected in graphic or image display on the smart phone's screen, the smart phone's speaker, and movements of the robotic body. The smart phone conveys movement commands to the robotic body via a communication channel established between the smart phone and the robotic body. The communication channel can be wired or wireless. For example, it can be a USB connection, a Bluetooth connection, or a wired connection via the audio jack of the smart phone.

The cost of robotic bodies can be reduced by minimizing the amount of processing and sensing there and having them focus on mechanical movements. That is achieved by enabling the robotic bodies to only contain a decoder of movement commands. The movement commands instruct the robotic bodies to perform simple motor and switch operations. The decoder translates the movement commands into outputs of electrical signals that control motors and switches resulting in mechanical movements. By defining a set of movement commands that facilitate interoperability between a variety of robot control units and a variety of robotic bodies, massive production of the decoder is made possible, bringing down the cost of decoder. Consequently, because of interoperability and lost-cost decoder, massive production of robotic bodies is made possible, bringing down the cost of robotic bodies.

Figure 2:
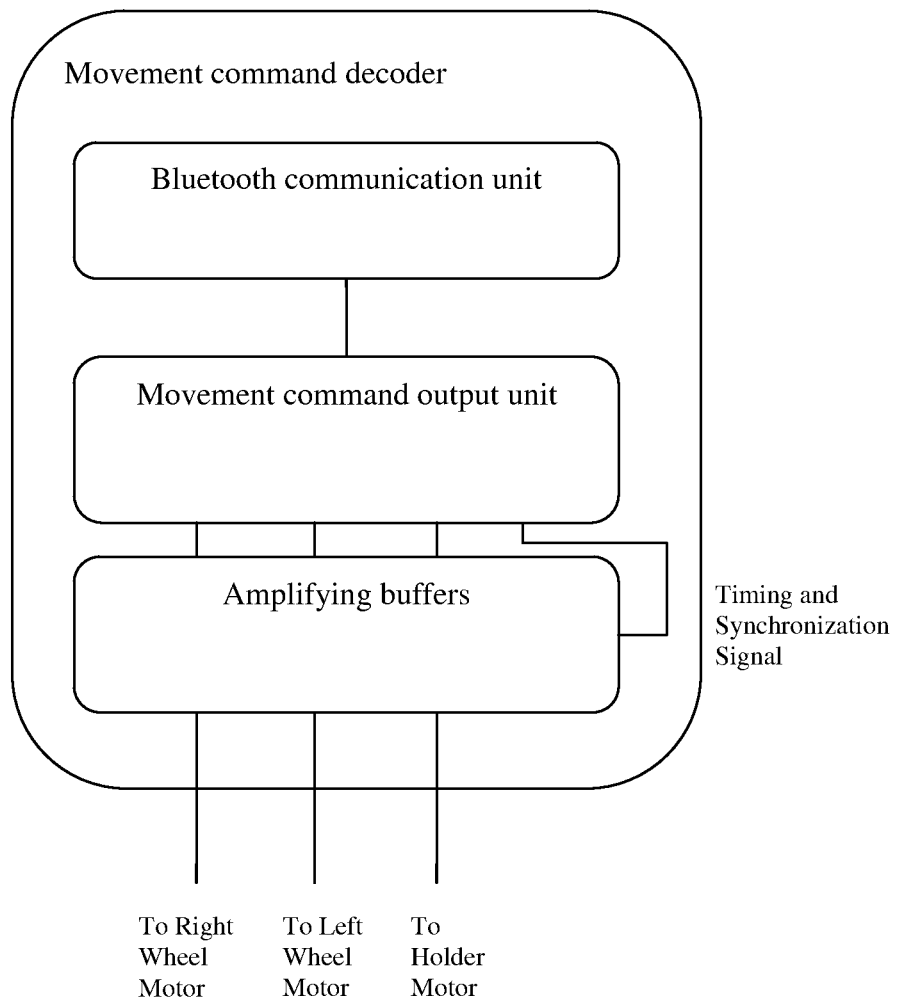
FIG. 2 illustrates an embodiment of the movement command decoder.
Figure 3:
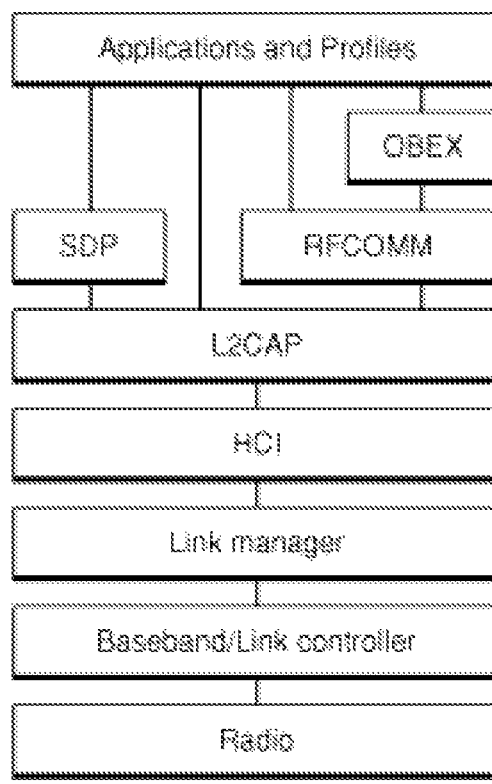
FIG. 3 is a diagram of the Bluetooth protocol stack.

FIG. 2 illustrates one embodiment of the movement command decoder used for the robot in FIG. 1. The movement command decoder relies on Bluetooth as the underlying communication channel. The Bluetooth protocol stack is shown in FIG. 3. The smart phone also supports Bluetooth, and there is pairing between the smart phone and the movement command decoder. The robot applications running on the smart phone convey the movement commands via Bluetooth communication channel. The movement command decoder comprises a Bluetooth communication unit that has a Bluetooth signal transceiver and protocol stack processor. Eventually the movement commands are decoded and converted into electrical signals that can control a number of motors and switches. An electrical signal from the movement command output unit can control the timing and synchronization of the operations of the motors and switches.

The set of movement commands comprises a basic description of operation of a motor or a switch: the motor and switch unit, the magnitude of the operation, and the duration of the operation. In the case of a motor, the magnitude of the operation is reflected as the rotational speed of the motor. In the case of a switch, the magnitude of the operation is reflected as 'on' or 'off' state or the intensity of the 'on' state. FIG. 4 illustrates how a set of movement commands may be conveyed as a Bluetooth protocol data unit for the robot in FIG. 1 that is powered by three motors. The first motor unit controls the right wheel; the second motor unit controls the left wheel; and the third motor unit controls the holder. The movement magnitude can be represented by a number range from −4 to +3. A negative number indicates a reverse movement, and a positive number indicates a forward movement. In the same time slice, there can be simultaneous motor operations. Therefore, a sequence of movement commands may be conveyed in one protocol data unit. The timing and synchronization of the simultaneous motor operations is controlled by a signal from the movement command output unit of the movement command decoder.

The precision of the mechanical movements of the robotic bodies may vary. The robot applications on the smart phones may calibrate the magnitude of the mechanical movements and duration time units using decision inputs and form a control feedback loop.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for providing a low-cost robot, comprising:
   (a) using a smart phone as a robot control unit;
   (b) using a robotic body that holds said smart phone and provides movements; and
   (c) conveying a plurality of movement commands from said smart phone to said robotic body that comprises a movement command decoder that decodes said plurality of movement commands to control said movements, wherein said robotic body is devoid of any processing unit other than said movement command decoder, wherein said movement command decoder decodes said plurality of movement commands received from said smart phone and generates electrical control signals for controlling operations of at least one motor and a corresponding switch.

2. The method as in claim 1, wherein using a smart phone as the robot control unit, comprising:
   (a) running robot applications installed on said smart phone;
   (b) processing images captured via said smart phone's camera as decision inputs;
   (c) processing sound signals received via said smart phone's microphone as decision inputs;
   (d) processing touch signals received via said smart phone's touch screen as decision inputs;
   (e) processing data from internet received via said smart phone's wireless network connection to an access gateway as decision inputs;
   (f) creating decision outputs based on decision inputs according to said robot applications; and
   (g) conveying decision outputs as a sequence of movement commands via a communication channel to said robotic body.

3. The method as in claim 1, wherein using a robotic body that holds said smart phone and provides movements, comprising:
   (a) providing a holder on said robotic body for said smart phone;
   (b) establishing a communication channel between said robotic body and said smart phone via Bluetooth, audio jack connection, USB connection, or peripheral connection; and
   (c) controlling moving parts of said robotic body according to movement commands received from said smart phone.

4. The method as in claim 1, wherein conveying a plurality of movement commands from said smart phone to said robotic body that comprises a movement command decoder that decodes said plurality of movement commands to control said movements, comprising:
   (a) converting decision outputs from said smart phone into a sequence of movement commands;
   (b) transmitting said sequence of movement commands via communication channel between said robotic body and said smart phone; and
   (c) converting said sequence of movement commands received on said robotic body into electrical signals that control mechanical movements of said robotic body.

5. The method as in claim 1, wherein said electrical control signals comprise signals for controlling the timing and synchronization of said operations.

6. A robot, comprising:
(a) a smart phone as a robot control unit; and
(b) a robotic body that holds said smart phone, provides movements, and comprises a movement command decoder that decodes a plurality of movement commands from said smart phone to control said movements, wherein said robotic body is devoid of any processing unit other than said movement command decoder, wherein said movement command decoder decodes said plurality of movement commands received from said smart phone and generates electrical control signals for controlling operations of at least one motor and a corresponding switch.

7. The robot as in claim 6, wherein said smart phone as the robot control unit, comprising:
(a) robot applications installed;
(b) camera that captures images as decision inputs;
(c) microphone that receives sound signals as decision inputs;
(d) touch screen that receives touch signals as decision inputs;
(e) wireless network connection unit that receives data from internet as decision inputs;
(f) processing unit that creates decision outputs based on decision inputs according to said robot applications and converts said decision outputs into a sequence of movement commands; and
(h) communication unit that establishes communication channel to said robotic body and conveys said sequence of movement commands through said communication channel.

8. The robot as in claim 7, wherein said communication channel unit operates on a Bluetooth connection, audio jack connection, USB connection, or peripheral connection.

9. The robot as in claim 6, wherein said wireless network connection unit operates on a WI-FI network or cellular network.

10. The robot as in claim 6, wherein said robotic body, comprising:
(a) holder for said smart phone;
(b) communication unit that receives a sequence of movement commands from said smart phone through communication channel;
(c) movement command decoder that converts a sequence of movement commands into electrical signals; and
(d) moveable parts controlled by electrical signals.

11. The robot as in claim 6, wherein said movement command decoder implements a set of movement commands that indicate basic motor and switch operations.

12. The robot as in claim 11, wherein said set of movement commands comprises indication of motor and switch unit, magnitude of operation, and duration of operation.

* * * * *